United States Patent [19]

Summers

[11] 4,097,683
[45] Jun. 27, 1978

[54] TERMINAL HOUSING FOR BURIED ELECTRICAL CABLES AND METHOD OF EXPANDING SAME

[75] Inventor: Frank C. Summers, Park Ridge, Ill.

[73] Assignee: Coil Sales & Manufacturing Co., Rolling Meadows, Ill.

[21] Appl. No.: 723,571

[22] Filed: Sep. 15, 1976

[51] Int. Cl.² .............................................. H02G 9/02
[52] U.S. Cl. ...................................... 174/38; 174/60; 220/8
[58] Field of Search .......................... 174/37, 38, 60; 220/3.8, 3.9, 3.92, 3.94, 18, 4 A, 8, 85 A; 312/100; 285/177; 179/98; 361/426, 427, 428, 429

[56] References Cited

U.S. PATENT DOCUMENTS

| 586,464 | 7/1897 | Tobey | 174/60 |
|---|---|---|---|
| 1,462,026 | 7/1923 | Booth | 174/60 |
| 2,916,539 | 12/1959 | Hamilton | 174/38 |
| 3,162,718 | 12/1964 | Gunthel, Jr. | 174/38 |
| 3,164,668 | 1/1965 | Skubal | 174/38 X |
| 3,751,575 | 8/1973 | Barb | 174/38 X |
| 3,769,460 | 10/1973 | Charles | 174/38 |
| 3,812,279 | 5/1974 | Voegeli | 174/38 |
| 3,892,910 | 7/1975 | Smith | 174/37 |

FOREIGN PATENT DOCUMENTS

| 646,478 | 7/1928 | France | 174/60 |
|---|---|---|---|
| 2,244,819 | 6/1973 | Germany | 220/3.8 |
| 361,070 | 7/1938 | Italy | 174/60 |
| 1,339,685 | 12/1973 | United Kingdom | 174/60 |

*Primary Examiner*—Laramie E. Askin
*Attorney, Agent, or Firm*—Leydig, Voit, Osann, Mayer & Holt, Ltd.

[57] ABSTRACT

A housing for surface connections in buried electrical cables which protects the electrical components thereof from flooding and other environmental conditions and which is adapted for easy expansion in both width and/or height and modification as demand requires. The electrical components coupled to the cable are insulated from flood water by air contained within an inverted cover positioned over the components and a portion of the base upon which they are supported. The amount of space available for the electrical components can be readily expanded without alteration to the existing base and components through the use of an adapter capable of supporting additional components and accommodating a larger cover.

9 Claims, 7 Drawing Figures

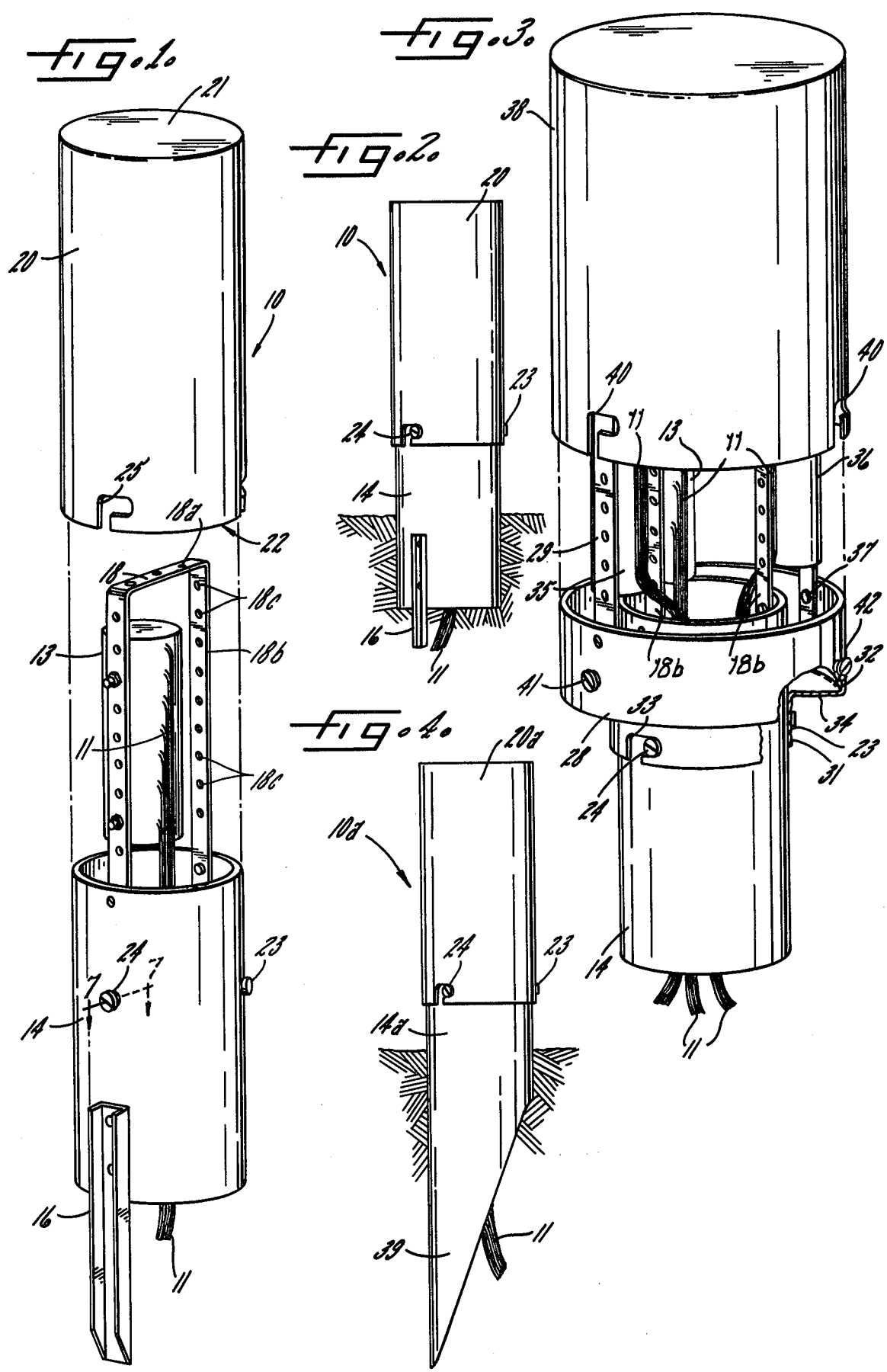

TERMINAL HOUSING FOR BURIED ELECTRICAL CABLES AND METHOD OF EXPANDING SAME

DESCRIPTION OF THE INVENTION

The present invention relates generally to protective systems for surface connections in buried electrical cables and more particularly to such systems that are especially adapted for housing and protecting load coil installations, electrical terminals, and the like in communication lines.

While some connections in communication lines may be buried with the cable itself, there are many applications in which the connection must be readily accessible without excavation. In such cases the cable is brought to the surface at the point of connection. The portion of the cable that is above the surface and the connection itself usually must be protected from tampering, as well as the environmental elements, such as flooding, snow, dust and light. Typically, this is accomplished by containing the electrical components utilized in making the connections in a suitable housing located near the ground level.

It is desirable that such housing arrangements be designed to facilitate ready expansion for accommodating increasing equipment needs because of larger demands in an expanding area. In known housing and enclosure arrangements, however, it is often necessary to either re-excavate the existing facility and replace it with one of larger capacity or make rather extensive on-site alterations to the existing facility in order to increase the capacity of the unit. As an alternative, in some instances, the electrical components are simply attached to the outside of the existing facility because there is not sufficient space remaining in the housing or the new electrical component is too large to fit in the existing housing. This has the disadvantage of being unsafe, unsightly, and increases exposure of the electrical components to the elements, breakage and tampering.

Accordingly, it is an object of the present invention to provide a system for housing surface electrical connections in buried cables which not only offers effective protection against flooding and other adverse environmental conditions, but also is characterized by being readily expandable in width and/or heighth in the field as the need requires.

Another object is to provide an electrical connection housing as characterized above in which the diameter of the housing may be conveniently increased to accommodate equipment of larger size.

A further object is to provide an electrical connection housing of the above kind that is of relatively simple construction, and thus, can be economically made and easily utilized in the field.

Other objects and advantages of the invention will become apparent from the following detailed description taken in connection with the accompanying drawings, in which:

FIG. 1 is a perspective of a housing for surface electrical connections with a standard size cover displaced vertically to show the electrical components contained therein;

FIG. 2 is a reduced scale side elevation view of the housing apparatus shown in FIG. 1 with its cover in an operational position;

FIG. 3 is a perspective of a housing apparatus for surface connections according to the present invention, the base of which corresponds to that of the apparatus shown in FIG. 1, but which is fitted with an expanding adapter and a larger, diameter auxiliary cover;

FIG. 4 shows another form of housing apparatus that can be used with the present invention;

Figure 5:
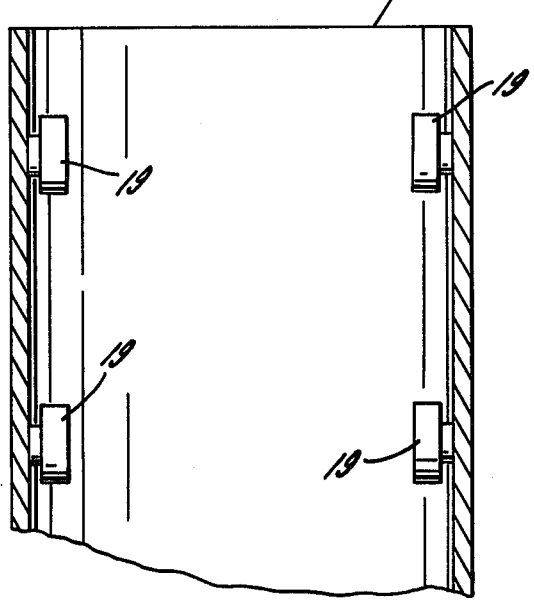
FIG. 5 is an enlarged fragmentary section of the upper portion of the housing base.

While the invention is susceptible of various modfications and alternative constructions, certain illustrative embodiments thereof have been shown in the drawings and will be described below in more detail. It should be understood, however, that there is no intention to limit the invention to the specific forms disclosed, but, on the contrary, the intention is to cover all modifications, alternative constructions and equivalents falling within the spirit and scope of the invention.

Turning now more particularly to FIGS. 1 and 2 of the drawings, there is shown an illustrative housing 10 for supporting and protecting a surface connection of a buried electrical cable 11. The cable 11 may be a communication line of the type that is buried in the ground between access points where it is raised above the surface of the ground to permit connection with a point of use. The connection may consist of one or more electrical components. In the illustrated embodiment, there is shown a single electrical component 13, such as an encased load coil, that is coupled to the cable 11 in a known manner.

The housing 10 includes a base 14 and a standard size cover 20 which in this case both have tubular configurations. The base 14 is mounted in the ground in an upright position with the upper end thereof extending above the level of the ground. To insure secure mounting of the base 14 in the ground, one stake 16 preferably is secured in depending relation adjacent a lower side of the base. The tubular base 14 in the present instance has both of its ends open with the cable 11 passing completely through the base to the component 13. As an alternative means of supporting the housing in the ground, FIG. 4 shows a housing apparatus 10a which includes a base 14a and cover 20a similar to that shown in FIGS. 1 and 2, except that the base 14a has an integrally formed pointed spike portion 39 for mounting in the ground.

For supporting the component 13 in upstanding relation above the base 14, the component is fixed to a vertically disposed bracket 18 mounted on the inside wall of the base 14. It will be appreciated that the cross-section of the tubular base and the configuration of the bracket can be adapted to the particular electrical component or components with which the apparatus is to be used. The primary design criterion is that neither the bracket nor the components extend outwardly beyond the radial periphery of the base. The bracket in this case is in the form of a U-shaped member having a top plate 18a and a pair of depending legs 18b. The bracket is formed with a plurality of spaced apertures 18c for facilitating the connection of one or more electrical components at a desired location.

Figure 6:
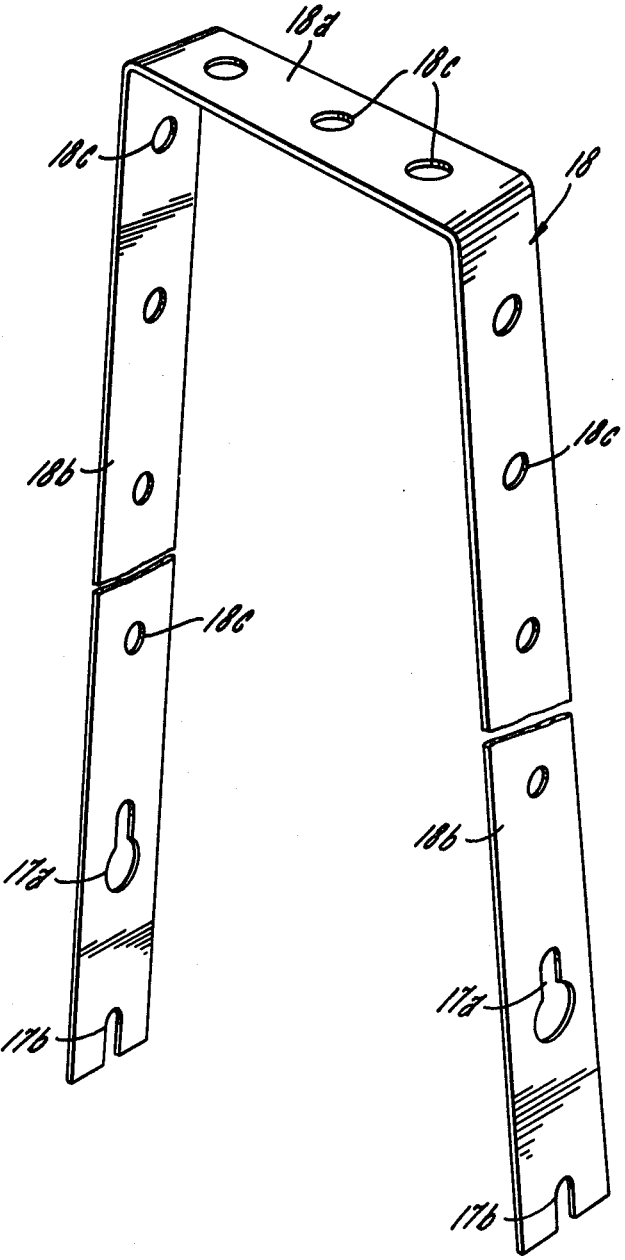
FIG. 6 is an enlarged perspective of one of the component support brackets used in the illustrated housing apparatus, shown here in a dissembled condition.

To support the bracket in upstanding relation on the base 14, two pairs of inwardly directed pins 19 extend from diametrically opposed positions within the base. The bracket legs 18b each are formed with a slotted aperture 17a and a downwardly opening vertical slot 17b for positioning over the respective vertically aligned pairs of the pins 19. The bracket 18 preferably is made of a lightweight resilient metal, and the legs 18b are directed outwardly with respect to each other, as shown in FIG. 6. To assemble the bracket, it is only necessary to force the legs 18b inwardly toward each other, place the bracket such that the leg apertures 17a and slots 17b are adjacent the pins 19, release the legs 18b, and lower the bracket into its assembled position. The heads of the pins 19 will positively retain the bracket in such assembled condition without the need for auxiliary fasteners. To remove the bracket 18, the reverse procedure is followed, namely lifting the bracket, forcing the legs 18b together to clear the upper retaining pins 19, and then removing it from the base 14.

If desired, rather than utilizing a bracket to support the electrical component or components, a mounting board could be used. Thus, a suitable mounting board can comprise a plastic or metallic sheet adapted to fit in position on the pins 19 or other supporting members. This serves to separate the internal area into two parts, one enclosing the cable or cables (often referred to as the cable side) and the other, the buried drops and connecting blocks (often termed the distribution side). An internal shroud can also be employed to enclose the cable side. This allows access to be restricted on the distribution side to only those wire pairs predetermined to serve the particular location. Suitable mounting boards and shrouds are well known.

Figure 7:
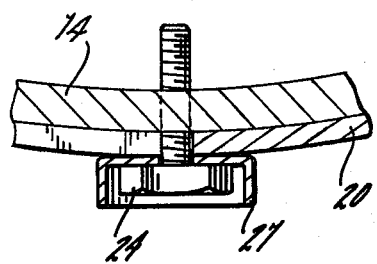
FIG. 7 is an enlarged fragmentary section of one of the cover retaining screws taken in the plane of line 7—7 in FIG. 1

For protecting the electrical component 13 from flooding and other adverse environmental conditions, such as snow, dirt and light, an open ended cover 20 having an internal component receiving chamber is positionable in an inverted fashion over the component with its open end facing downwardly. In the illustrated embodiment, the cover 20 is tubular-shaped having a closed end 21 and an open end 22 so as to define an open ended internal chamber. The cover 20 in the present instance has a diameter only slightly larger than the diameter of the tubular base to permit it to be positioned in tight fitting relation over the base 14 for enclosing the component 13, the bracket 18 and the upper portion of the base 14. For securing the cover 20 against axial movement with respect to the base 14 when in mounted position, a pair of stationary pins 23 and a screw 24 extend in an outward fashion from the base 14. The screw 24 is threadably engageable with the base and in the present instance is provided with a protective cup washer 27, as shown in FIG. 7. The lower end of the cover 20 is formed with three correspondingly spaced downwardly opening right angle slots 25 for receiving the respective pins 23 and screw 24 when the cover is positioned on the base. By rotating the cover so that the pins 23 and screw 24 are located in the horizontal portion of the right angle slots 25 and then tightening of the single screw 24, the cover will be positively secured against turning and axial removal.

It will be seen that with the electrical component 13 mounted vertically above the base 14 the component will be completely received within the internal chamber of the cover 20 when the cover is placed upon the base. Through the bell jar effect created by such arrangement, the electrical component 13 will be protected from the outside elements and flooding, even without an airtight seal between the cover and base. The air contained within the inverted cover 20 will prevent the rise of flood water within the cover beyond the relatively small amount necessary to equilize the pressure at the air/water interface within the cover. For example, with a cover height of 30 inches and 1 foot of flooding (as measured from the lower edge of the cover) water will rise inside the cover about 0.8 inch. Even with 10 feet of flooding, which completely submerges the cover, water will rise only about 6.5 inches inside the cover. It will be apparent that the component 13 may be supported by the bracket 18 sufficiently high within the cover so that such limited water rise would not reach the component 13. Furthermore, the means for positively securing the cover to the base described above will retain it against buoyant forces generated by such flood conditions. While the bell jar effect of the cover will protect the component contained therein from such flooding conditions, preferably, the cover and base should be in a relatively close fitting relation with the cover overlapping the base by a sufficient amount, such as about 5 inches for a 30 inches cover, so that snow, dust and light also are effectively prevented from entering the enclosure.

In accordance with a primary aspect of the invention, the base of the housing apparatus is adapted to removably accept, in lieu of its standard size cover, an adapter that has a greater component receiving area than the base so as to enable ready expansion in the capacity of the installation or the addition of larger size electrical equipment without the need for altering the existing base or the components mounted thereon. Referring to FIG. 3, the housing apparatus 10 is there shown with its standard size cover 20 removed and replaced by an adapter 28 which includes a supplemental upstanding bracket 29 for supporting additional or larger size electrical components 35, 36 respectively. The adapter 28 in this case comprises two concentric tube sections 31, 32 having an interconnecting web 34 therebetween, and the adapter section 31 is formed for snug mounting over the base 14. For releasably securing the adapter in place, the adapter section 31 in this case has three downwardly opening right angle slots 33 in the lower end thereof for receiving the screw 24 and pins 23 in a manner similar to that by which the original cover 20 was mounted. In this case, however, the slots 33 formed in the adapter sleeve 31 not only facilitate securing of the adapter to the base, but also serve to establish a predetermined angular relation of the adapter to insure proper positioning of the supplemental support bracket 29 with respect to the bracket 18 and component 13 originally mounted on the base. It can be seen that by reason of the significantly greater cross-sectional area of the adapter section 32 the electrical components 35 and 36 can be added to expand the facility without the need for altering the installation of the original component 13. The bracket 29 is similar to the bracket 18, but of larger size, and is releasably mountable in upstanding relation to the adapter by retaining pins 37 extending inwardly from opposite sides of the adapter in the same manner the bracket 18 is secured to the base. Again, neither the bracket 29 nor the components mounted thereon extend outwardly beyond the outer periphery of the adapter sleeve 32.

To protect the electrical components supported both by the base 14 and the adapter 28, an auxiliary cover 38, similar to the cover 20 but of larger diameter, and, if desired, height, it positionable over the electrical components and their support bracketry. The cover 38 again is tubular shaped, defining an open ended internal chamber within which the electrical components are received when the cover is positioned onto the adapter 28. The cover 38 in this case is formed with substantially the same diameter as the adapter section 32 and is positionable into overlapping relation with the adapter section 32 when mounted. For releasably securing the cover 38 in its mounted position, its lower end similarly is formed with downwardly opening right angle slots 40 and the adapter section 32 is provided with a fastening screw 41 and retaining pins 42 similar to the screw 24 and pins 23 of the base. The air contained within the inverted auxiliary cover 31 again will protect the original electrical element 13 as well as the added elements 35, 36 from flooding or other adverse environmental conditions. Thus, it can be seen that the expansion of the facility through the use of the adapter 28, the auxiliary cover 38, and the auxiliary bracket 29 may be accomplished quickly and conveniently in the field without the need for replacing the existing base or altering the existing installation. However, it will be appreciated that if it is desired to remove the axial support bracket 18, that can be easily accomplished by lifting the bracket and forcing together the bracket legs 18b, as previously described. Removal of the bracket 18 not only may be desirable during expansion of the installation, it also enables the base to be pounded for driving the support stake 16 into the ground during the initial installation. Upon reassembly of the expanded installation, it will be seen that the expanded facility will contain and protect the electrical elements from the environment and from tampering as effectively as did the original installation. The replaced cover 20 may be retained for use in another installation.

In view of the foregoing, it can be seen that the apparatus of the present invention provides a support and housing for surface electrical connections for buried cables which offers protection against flooding and other adverse environmental conditions without the need for supplementary sealing means such as plastic bags or the like. The apparatus is of relatively simple construction and can be readily and conveniently expanded in the field as need requires.

I claim as my invention:

1. An apparatus for housing surface electrical connections of buried electrical cables and components coupled thereto comprising a base, a first bracket means mounted in upstanding relation on said base for supporting an electrical component vertically above said base, an adapter mounted on said base, said adapter having a component supporting area greater than said base, second bracket means mounted in upstanding relation on said adapter for supporting an additional electrical component above said adapter and base, said second bracket means being positioned at a predetermined angle with respect to said first bracket means to insure proper positioning of an additional electrical component, a cover having an internal chamber, an open lower end and a closed upper end, said cover being mounted on said adapter with said first and second bracket means being received within said chamber to thereby protect them from flooding by air contained within said cover, means for preventing axial movement of said adapter relative to said base, and means for preventing axial movement of said cover relative to said adapter.

2. The apparatus of claim 1 in which said adapter is formed of two concentric tubular sections of different transverse dimensions and having an interconnecting web extending therebetween, the smaller of said concentric tubular sections being axially positioned over the end of said base and the larger of said concentric tubular sections mating with the open end of said cover.

3. The apparatus of claim 1 including locking members extending outwardly from said base, said adapter being formed with a plurality of downwardly opening L-slots receiving said locking members, at least one of said locking members being threadably engageable with said base to permit selective engagement thereof with said adapter, and said threadably engageable locking member engaging said mounted adapter.

4. The apparatus of claim 1 including means on said adapter for positively locking said cover on said adapter.

5. The apparatus of claim 4 in which said cover locking means includes a plurality of members extending outwardly from said adapter, said cover being formed with a plurality of downwardly opening L-slots receiving said adapter members, and at least one of said adapter members being threadably engageable with said adapter to permit selective engagement thereof with said cover.

6. The apparatus of claim 1 including means for removably mounting said first bracket means in upstanding relation on said base, and means for removably mounting said second bracket means in upstanding relation on said adapter.

7. The apparatus of claim 6 in which each of said bracket means is formed of a resilient material and has a U-shaped configuration with legs extending away from each other at a slight angle, and said means for mounting said first bracket means includes pins extending inwardly from the inside of said base, and said first bracket means legs are formed with pin receiving apertures and are selectively movable toward each other for positioning over said base pins and into mounted position.

8. The apparatus of claim 7 in which said second bracket mounting means includes pins extending inwardly from the inside of said adapter, and said second bracket legs are formed with pin-receiving apertures and are selectively movable toward each other for positioning over said adapter pins and into mounted position.

9. A method for expanding a surface housing for buried electrical cables and components coupled thereto which housing includes a base, a first bracket means mounted on the base in upstanding relation for supporting an electrical component and a removable cover mounted on the base and enclosing the first bracket means comprising the steps of:
  removing the cover,
  installing an adapter on the base, said adapter having a component supporting area greater than the base,
  mounting a second bracket means in upstanding relation on the adapter for supporting an additional electrical component above the adapter and base,
  installing an enlarged cover having an internal chamber, an open lower end and a closed upper end on the adapter with the first and second bracket means being received within the chamber to protect them from flooding, and
  locking the adapter on the base and the enlarged cover on the adapter to prevent axial movement of the adapter relative to the base and the enlarged cover relative to the adapter.

* * * * *